(12) United States Patent
Bunker (10) Patent No.: US 10,415,396 B2
(45) Date of Patent: Sep. 17, 2019

(54) AIRFOIL HAVING COOLING CIRCUIT

(71) Applicant: General Electric Company, Schenectady, NY (US)

(72) Inventor: Ronald Scott Bunker, West Chester, OH (US)

(73) Assignee: General Electric Company, Schenectady, NY (US)

( * ) Notice: Subject to any disclaimer, the term of this patent is extended or adjusted under 35 U.S.C. 154(b) by 476 days.

(21) Appl. No.: 15/150,634

(22) Filed: May 10, 2016

(65) Prior Publication Data
US 2017/0328215 A1  Nov. 16, 2017

(51) Int. Cl.
| *F01D 5/14* | (2006.01) |
| *F01D 5/18* | (2006.01) |
| *F01D 5/28* | (2006.01) |

(52) U.S. Cl.
CPC ............ *F01D 5/187* (2013.01); *F01D 5/147* (2013.01); *F01D 5/288* (2013.01); *F01D 5/186* (2013.01); *F05D 2220/32* (2013.01); *F05D 2230/90* (2013.01); *F05D 2260/202* (2013.01); *F05D 2260/204* (2013.01); *F05D 2260/232* (2013.01); *F05D 2300/611* (2013.01); *Y02T 50/676* (2013.01)

(58) Field of Classification Search
CPC .......... F01D 5/147; F01D 5/186; F01D 5/187; F01D 5/288; F05D 2260/202; F05D 2260/204; F05D 2220/32; F05D 2230/90; F05D 2260/203; F05D 2260/232; F05D 2300/611; Y02T 50/676
See application file for complete search history.

(56) References Cited

U.S. PATENT DOCUMENTS

| 3,698,834 A | 10/1972 | Meginnis |
| 3,963,368 A | 6/1976 | Emmerson |
| 5,363,645 A | 11/1994 | Pellet |
| 5,383,766 A | 1/1995 | Przirembel et al. |
| 5,626,462 A | 5/1997 | Jackson et al. |
| 5,640,767 A | 6/1997 | Jackson et al. |
| 6,280,140 B1 | 8/2001 | Soechting et al. |
| 6,375,425 B1 | 4/2002 | Lee et al. |
| 6,443,700 B1 | 9/2002 | Grylls et al. |
| 6,461,107 B1 | 10/2002 | Lee et al. |
| 6,499,949 B2 | 12/2002 | Schafrik et al. |
| 6,511,762 B1 | 1/2003 | Lee et al. |
| 6,582,194 B1 | 6/2003 | Birkner et al. |
| 6,746,755 B2 * | 6/2004 | Morrison .................. B32B 3/18 244/123.14 |
| 6,896,487 B2 | 5/2005 | Cunha et al. |
| 6,905,302 B2 | 6/2005 | Lee et al. |
| 7,097,425 B2 | 8/2006 | Cunha et al. |

(Continued)

OTHER PUBLICATIONS

International Search Report and Written Opinion issued in connection with corresponding PCT Application No. PCT/US2017/31494 dated Jul. 17, 2017.

*Primary Examiner* — Carlos A Rivera
*Assistant Examiner* — Jesse M Prager
(74) *Attorney, Agent, or Firm* — McGarry Bair PC (57) ABSTRACT

An airfoil for a turbine engine having an engine component including an internal cooling circuit fluidly coupled to a plurality of passages within the outer wall of the engine component where cooling air moves from the internal cooling circuit to an outer surface of the engine component through the passages.

31 Claims, 9 Drawing Sheets

(56) References Cited

U.S. PATENT DOCUMENTS

| | | | |
|---|---|---|---|
| 7,097,426 B2 | 8/2006 | Lee et al. | |
| 7,137,776 B2 | 11/2006 | Draper et al. | |
| 7,311,498 B2 | 12/2007 | Cunha et al. | |
| 7,364,405 B2 | 4/2008 | Cunha et al. | |
| 7,481,623 B1 | 1/2009 | Liang | |
| 7,513,744 B2 | 4/2009 | Cunha et al. | |
| 7,717,677 B1 | 5/2010 | Liang | |
| 7,766,617 B1 * | 8/2010 | Liang | F01D 5/186 415/115 |
| 7,775,768 B2 | 8/2010 | Devore et al. | |
| 7,837,441 B2 | 11/2010 | Spanger et al. | |
| 8,047,789 B1 * | 11/2011 | Liang | F01D 5/147 416/97 R |
| 8,360,726 B1 * | 1/2013 | Liang | F01D 5/187 416/241 R |
| 8,366,394 B1 * | 2/2013 | Liang | F01D 5/187 415/115 |
| 8,586,179 B1 | 11/2013 | Jacobsen et al. | |
| 8,714,927 B1 | 5/2014 | Jenne et al. | |
| 9,003,657 B2 | 4/2015 | Bunker et al. | |
| 9,200,521 B2 * | 12/2015 | Bunker | C23C 14/5886 |
| 2007/0280832 A1 * | 12/2007 | Liang | F01D 5/186 416/97 R |
| 2012/0125585 A1 * | 5/2012 | Morrison | B32B 18/00 165/172 |
| 2013/0272850 A1 | 10/2013 | Bunker | |
| 2014/0004310 A1 | 1/2014 | Rebak et al. | |
| 2014/0120274 A1 * | 5/2014 | Bunker | C23C 14/5886 428/34.1 |
| 2014/0302278 A1 | 10/2014 | Bunker | |
| 2015/0034604 A1 | 2/2015 | Subramanian et al. | |
| 2015/0064019 A1 | 3/2015 | Lacy et al. | |
| 2015/0143792 A1 | 5/2015 | Bunker | |
| 2015/0184857 A1 | 7/2015 | Cunha et al. | |
| 2015/0321289 A1 | 11/2015 | Bruck et al. | |
| 2015/0377034 A1 | 12/2015 | Quitter | |
| 2016/0010465 A1 | 1/2016 | Slavens et al. | |

* cited by examiner

AIRFOIL HAVING COOLING CIRCUIT

BACKGROUND OF THE INVENTION

Turbine engines, and particularly gas or combustion turbine engines, are rotary engines that extract energy from a flow of combusted gases passing through the engine onto a multitude of rotating turbine blades. Turbine engines have been used for land and nautical locomotion and power generation, but are most commonly used for aeronautical applications such as for aircraft, including helicopters. In aircraft, turbine engines are used for propulsion of the aircraft. In terrestrial applications, turbine engines are often used for power generation.

Turbine engines for aircraft are designed to operate at high temperatures to maximize engine efficiency, so cooling of certain engine components, such as the high pressure turbine and the low pressure turbine, can be beneficial. Typically, cooling is accomplished by ducting cooler air from the high and/or low pressure compressors to the engine components that require cooling. Temperatures in the high pressure turbine are around 1000° C. to 2000° C. and the cooling air from the compressor is around 500° C. to 700° C. While the compressor air is a high temperature, it is cooler relative to the turbine air, and can be used to cool the turbine.

Contemporary turbine blades generally include one or more interior cooling circuits for routing the cooling air through the blade to cool different portions of the blade, and can include dedicated cooling circuits for cooling different portions of the blade, such as the leading edge, trailing edge and tip of the blade.

BRIEF DESCRIPTION OF THE INVENTION

An airfoil for a turbine engine, the airfoil comprising: an outer wall having an outer surface and an inner surface bounding an interior space, the outer wall defining a pressure side and a suction side extending axially between a leading edge and a trailing edge and extending radially between a root and a tip, at least one coating applied to the outer surface; at least one skin cooling circuit comprising at least one channel formed in the outer surface and at least one film hole passing through the coating to the channel, at least one wall cooling passage provided within at least a portion of an interior of the outer wall and at least one film hole passing through the coating and a portion of the interior of the outer wall to the wall cooling passage; and first and second supply circuits located within the interior of the wall, with the first supply circuit fluidly coupling a first air supply to the at least one channel to define a skin cooling circuit and the second supply circuit fluidly coupling the second air supply to the at least one wall cooling passage to define a wall cooling circuit.

An engine component for a turbine engine, which generates a hot air flow, and provides a cooling fluid flow, the component comprising: a wall separating the hot air flow from the cooling fluid flow and having a first surface along which the hot air flows in a hot flow path and a second surface facing the cooling fluid flow, at least one coating applied to the first surface, at least one skin cooling circuit comprising at least one channel formed in the first surface and at least one hole passing through the at least one coating to the channel, at least one wall cooling passage provided within at least a portion of an interior of the wall, first and second supply circuits, with the first supply circuit fluidly coupling the cooling fluid flow to the at least one channel to define a skin cooling circuit and the second supply circuit fluidly coupling the cooling fluid flow to the at least one wall cooling passage to define a wall cooling circuit.

A method of cooling an airfoil comprising passing a cooling airflow from a source in parallel to a) an interior of an outer wall of an airfoil to form a wall cooling circuit, and b) to a channel in an outer surface of the outer wall, and then to a hole in a coating overlying the outer surface to form a skin cooling circuit.

DESCRIPTION OF EMBODIMENTS OF THE INVENTION

The described embodiments of the present invention are directed to an engine component for an engine having a cooling circuit comprising skin cooling circuits and wall cooling passages each separately coupled to an internal passage or supply circuit within for example an airfoil to cool an outer surface of the airfoil. For purposes of illustration, the present invention will be described with respect to the turbine for an aircraft gas turbine engine. It will be understood, however, that the invention is not so limited and may have general applicability within an engine, including compressors, as well as in non-aircraft applications, such as other mobile applications and non-mobile industrial, commercial, and residential applications.

As used herein, the term "forward" or "upstream" refers to moving in a direction toward the engine inlet, or a component being relatively closer to the engine inlet as compared to another component. The term "aft" or "downstream" used in conjunction with "forward" or "upstream" refers to a direction toward the rear or outlet of the engine or being relatively closer to the engine outlet as compared to another component.

Additionally, as used herein, the terms "radial" or "radially" refer to a dimension extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present invention, and do not create limitations, particularly as to the position, orientation, or use of the invention. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

Figure 1:
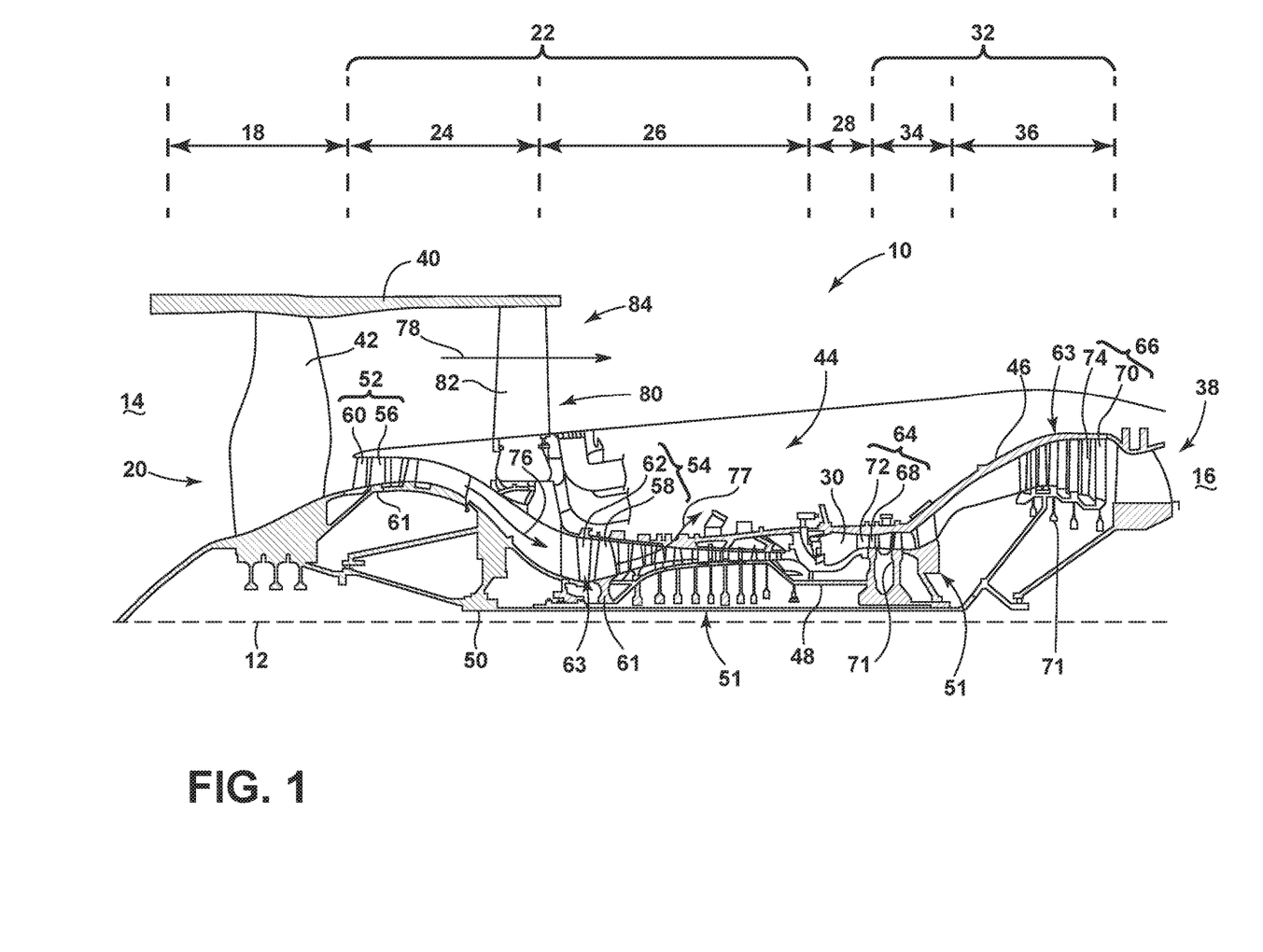
FIG. 1 is a schematic cross-sectional diagram of a turbine engine for an aircraft.

FIG. 1 is a schematic cross-sectional diagram of a turbine engine 10 for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12. The HP compressor 26, the combustor 30, and the HP turbine 34 form a core 44 of the engine 10, which generates a hot air flow. The core 44 is surrounded by core casing 46, which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20. The spools 48, 50 are rotatable about the engine centerline and couple to a plurality of rotatable elements, which can collectively define a rotor 51.

The LP compressor 24 and the HP compressor 26 respectively include a plurality of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned upstream of and adjacent to the rotating blades 56, 58. It is noted that the number of blades, vanes, and compressor stages shown in FIG. 1 were selected for illustrative purposes only, and that other numbers are possible.

The blades 56, 58 for a stage of the compressor can be mounted to a disk 61, which is mounted to the corresponding one of the HP and LP spools 48, 50, with each stage having its own disk 61. The vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

The blades 68, 70 for a stage of the turbine can be mounted to a disk 71, which is mounted to the corresponding one of the HP and LP spools 48, 50, with each stage having a dedicated disk 71. The vanes 72, 74 for a stage of the compressor can be mounted to the core casing 46 in a circumferential arrangement.

Complementary to the rotor portion, the stationary portions of the engine 10, such as the static vanes 60, 62, 72, 74 among the compressor and turbine section 22, 32 are also referred to individually or collectively as a stator 63. As such, the stator 63 can refer to the combination of non-rotating elements throughout the engine 10.

In operation, the air flow exiting the fan section 18 is split such that a portion of the air flow is channeled into the LP compressor 24, which then supplies pressurized air 76 to the HP compressor 26, which further pressurizes the air. The pressurized air 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

A portion of the pressurized air flow 76 can be drawn from the compressor section 22 as bleed air 77. The bleed air 77 can be draw from the pressurized air flow 76 and provided to engine components requiring cooling. The temperature of pressurized air flow 76 entering the combustor 30 is significantly increased. As such, cooling provided by the bleed air 77 is necessary for operating of such engine components in the heightened temperature environments.

A remaining portion of the air flow 78 bypasses the LP compressor 24 and engine core 44 and exits the engine assembly 10 through a stationary vane row, and more particularly an outlet guide vane assembly 80, comprising a plurality of airfoil guide vanes 82, at the fan exhaust side 84. More specifically, a circumferential row of radially extending airfoil guide vanes 82 are utilized adjacent the fan section 18 to exert some directional control of the air flow 78.

Some of the air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Figure 2:
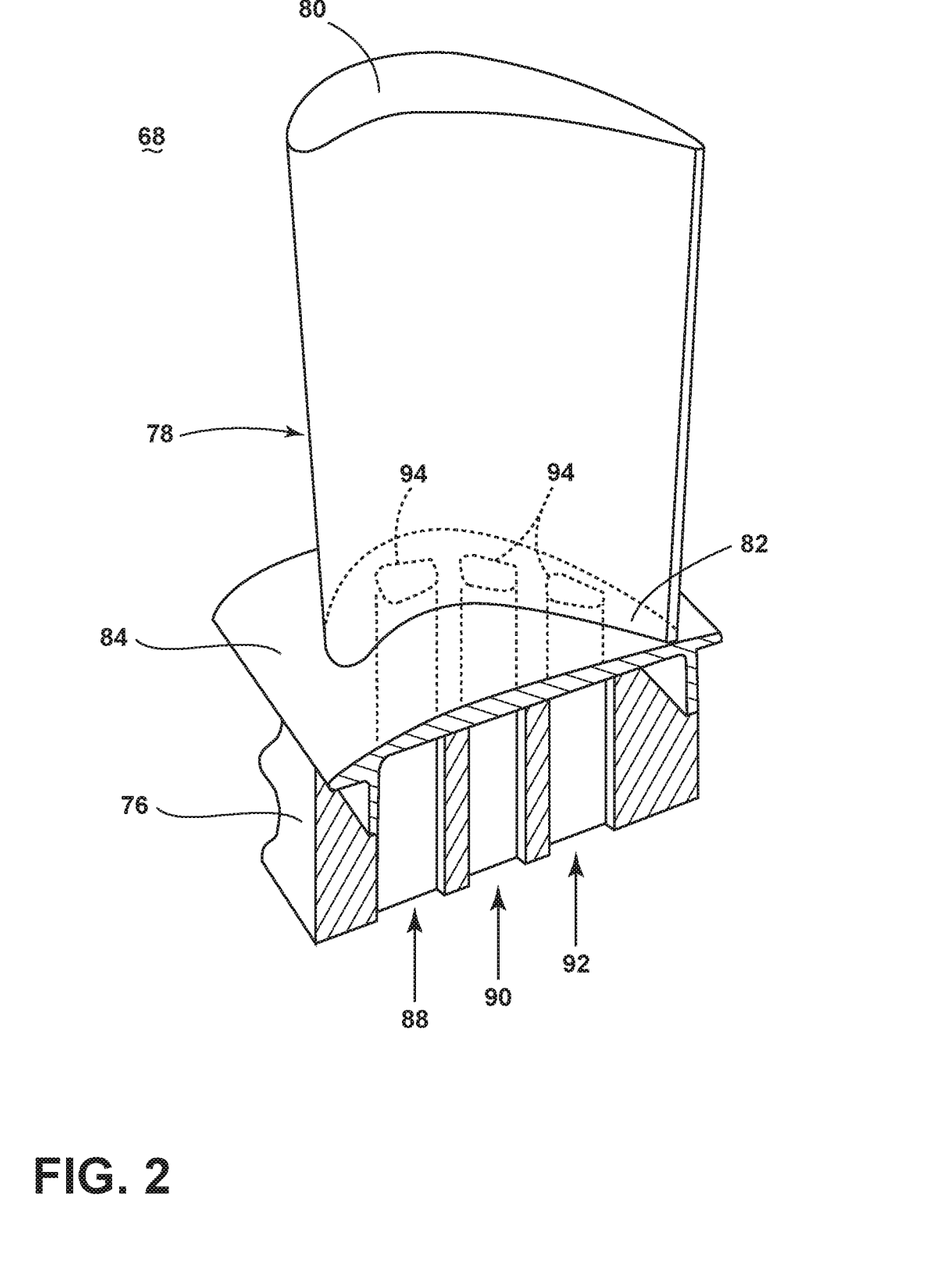
FIG. 2 is a perspective view of an engine component in the form of a turbine blade of the engine of FIG. 1 with cooling air inlet passages.

FIG. 2 is a perspective view of an engine component in the form of one of the turbine blades 68 of the engine 10 from FIG. 1. The turbine blade 68 includes a dovetail 79 and an airfoil 79. The airfoil 79 extends radially between a root 83 and a tip 81. The dovetail 79 further includes a platform 84 integral with the airfoil 79 at the root 83, which helps to radially contain the turbine air flow. The dovetail 79 can be configured to mount to a turbine rotor disk on the engine 10. The dovetail 79 comprises at least one inlet passage, exemplarily shown as a first inlet passage 88, a second inlet passage 90, and a third inlet passage 92, each extending through the dovetail 79 to provide internal fluid communication with the airfoil 79 at a passage outlet 94. It should be appreciated that the dovetail 79 is shown in cross-section, such that the inlet passages 88, 90, 92 are housed within the body of the dovetail 79.

Figure 3:
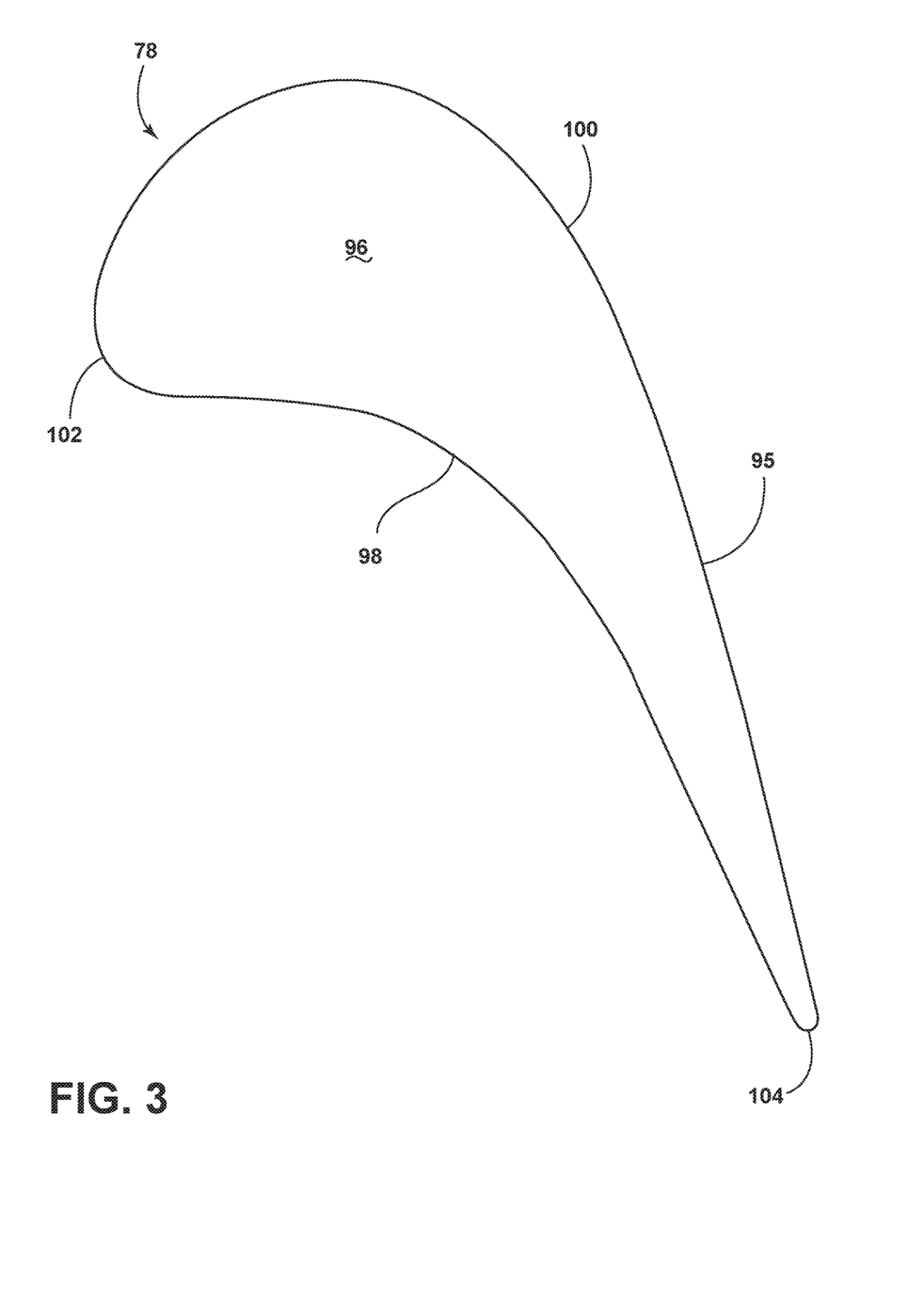
FIG. 3 is a schematic peripheral view of the airfoil of FIG. 2.

Turning to FIG. 3, the airfoil 79, shown in cross-section, comprises an outer wall 95 bounding an interior space 96 having a concave-shaped pressure side 98 and a convex-shaped suction side 100 which are joined together to define an airfoil shape extending axially between a leading edge 102 and a trailing edge 104. The blade 68 rotates in a direction such that the pressure side 98 follows the suction side 100. Thus, as shown in FIG. 3, the airfoil 79 would rotate upward toward the top of the page.

Figure 4:
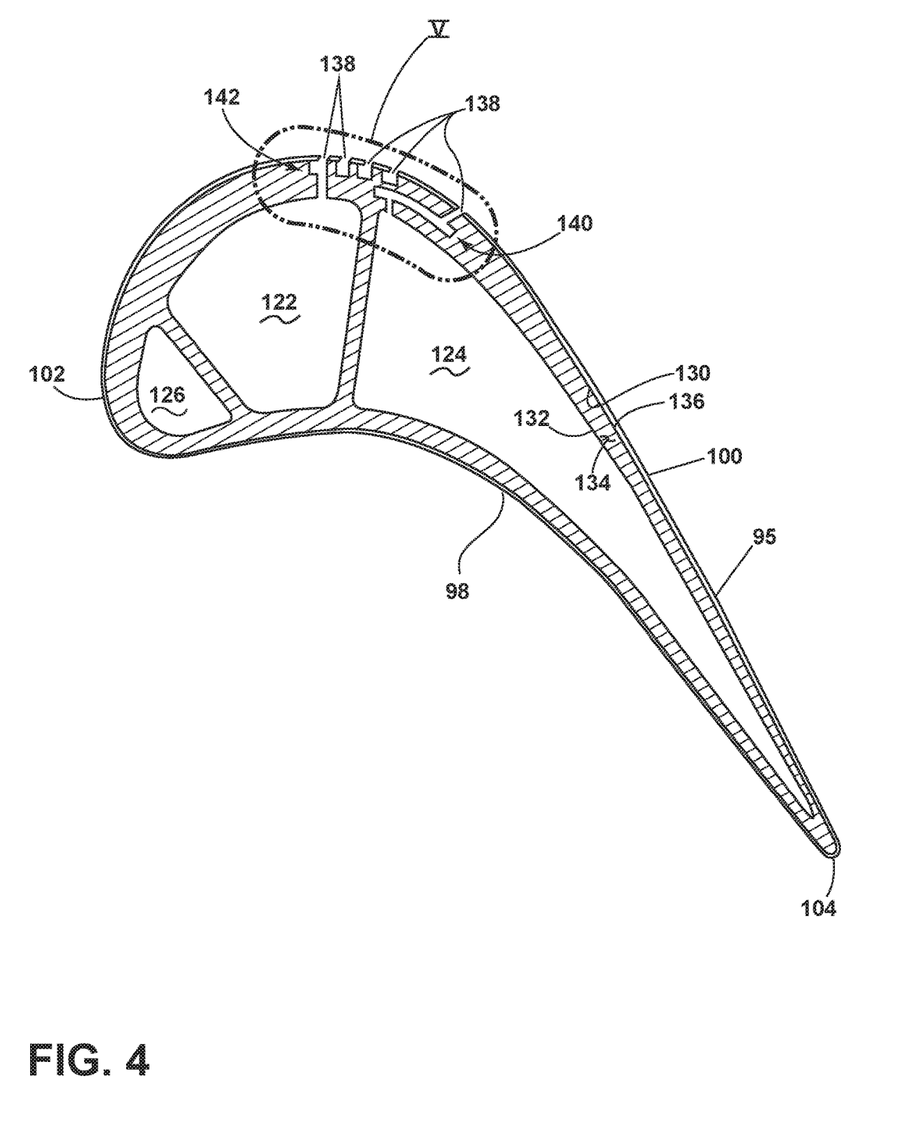
FIG. 4 is a cross sectional view of the airfoil of FIG. 2 and illustrating a plurality of internal passages.

Referring to FIG. 4, the interior space 96 can be divided into a plurality of internal cooling air supply circuits 122, 124, 126 which can be arranged in any formation within the interior space 96 and are dedicated to supply cooling air to the interior space 96. The supply circuits are fluidly coupled to at least one of the inlet passages 88, 90, 92 where internal fluid communication is provided to at least one of the supply circuits through the passage outlet 94.

It should be appreciated that the respective geometries of each individual supply circuit within the airfoil 79 as shown is exemplary, and not meant to limit the airfoil to the number of supply circuits, their geometries, dimensions, or positions as shown. Additionally the supply circuits 122, 124, 126 can be fluidly coupled to each other to provide additional internal fluid communication between adjacent supply circuits. Further, while three supply circuits are shown, there can be any number of supply circuits from none, to one, to multiple, for example.

The outer wall 95 comprises an outer surface 130 and an inner surface 132, which defines an interior 134 that is generally solid. At least one coating 136 is applied to the outer surface 130 where the coating 136 can include one or more layers comprising metallic, ceramic, or any other suitable material. The outer surface 130 and the at least one coating define a "skin" for the airfoil. The outer wall 95, including the skin, separates a hot air flow H on a first surface 128 of the airfoil from a cooling fluid flow C along a second surface 129 and supplied to the supply circuits 122, 124, 126. The coating 136 can be formed by various known methods such as spray, vapor deposition, and so forth, and also by additive manufacturing.

A plurality of film holes 138 can be provided through the surface of the outer wall 95 to provide cooling air onto the exterior of the airfoil 79. A wall cooling circuit 140 and a skin cooling circuit 142 are provided with the airfoil 79 and can each be fluidly connected to one of the plurality of film holes 138 to cool the outer wall 95 and the skin 130, 136. It should be understood that film holes can be film cooling exits of any geometry, such as but not limited to holes, shaped holes, and slots.

It can be contemplated that the skin cooling circuit 142 and wall cooling circuit 140 can be multiple skin and wall cooling circuits 142, 140 and that at least some of the skin and wall cooling circuits 140, 142 are fluidly coupled to multiple supply circuits and circumscribe a portion of or the entire airfoil interior 96. Though three supply circuits are illustrated, more or less supply circuits can be located within the airfoil interior 96.

Figure 5:
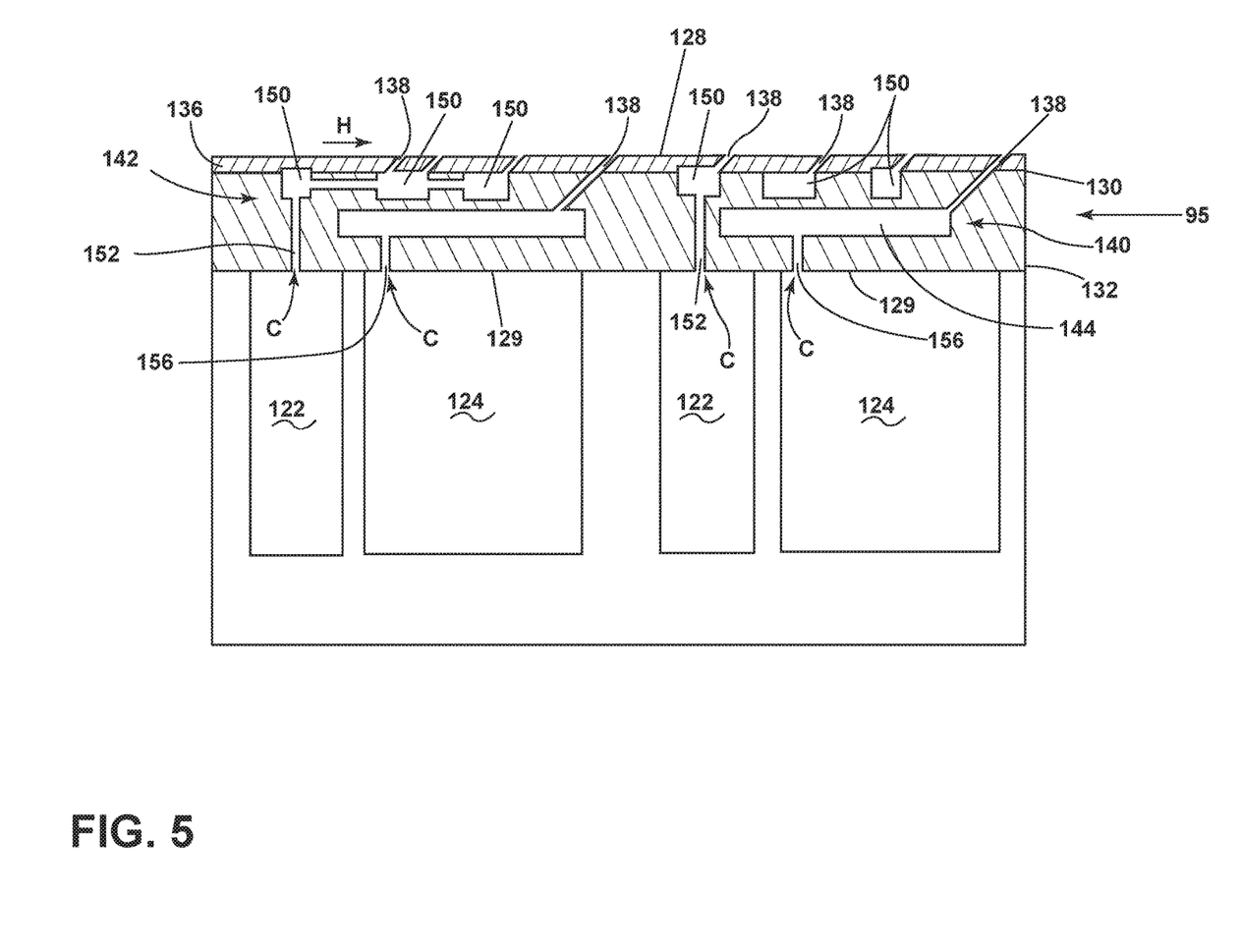
FIG. 5 is a schematic representation of a call out portion of the airfoil of FIG. 4 illustrating a wall cooling circuit, a skin cooling circuit, and an air supply circuit.

Referring to FIG. 5, the details of the wall cooling circuit 140 and the skin cooling circuit 142 will be described with respect to this schematic representation of a portion of the airfoil FIG. 4. The skin cooling circuit 142 comprises at least one channel 150 provided in the outer surface 130 and at least one film hole 138 passing through the coating 136 to the channel 150. The skin cooling circuit 142 can be formed in the outer surface 130 or in the coating 136 or formed in a combination of both as illustrated. In some embodiments, a portion of the coating 136 shown could be part of the same substrate that forms the channels 150, and then a coating added on top, enclosing the skin cooling circuit 142 with a non-coating material for example with a metal plate that is brazed on or attached to the outer surface. It should be understood that the multiple channels and passages shown are exemplary and not meant to be limiting for example in shape, orientation, or size.

The at least one channel 150 can be multiple channels 150, which are fluidly coupled to each other or fluidly separate from each other. The multiple channels 150 may be arranged in groups, which can be used to form sub-circuits within the skin cooling circuit 142. The multiple channels 150 can vary in width and length. It is further contemplated that multiple film holes 138 can pass through the coating to only one of the multiple channels 150 or to several or all of the multiple channels 150. It can be contemplated that the channels 150 can be of the same or less dimensions as the wall cooling passages 144, and in further embodiments are 50% or less of the wall cooling passages 144.

The skin cooling circuit 142 is fluidly coupled to a first supply circuit 122 located within the interior space 96 of the airfoil 79. The first supply circuit 122 is fluidly coupled to at least one of the channels 150 through at least one internal hole 152 that can be formed as an aperture or slot.

The wall cooling circuit 140 comprises one or more wall cooling passages 144 provided within the interior 134 of the wall 95 and bounded by the outer and inner surfaces 130, 132 and at least one film hole 138 passing through the coating 136 and the interior 134 to the wall cooling passage 144. It is further contemplated that multiple film holes 138 can pass through the coating to the wall cooling passage 144.

A second supply circuit 124 located within the interior space 96 of the airfoil 79 is fluidly coupled to at least one of the wall cooling passages 144 through another at least one internal hole 156. The wall cooling circuit 140 including the second supply circuit 124 and the wall cooling passage 144 are fluidly separate from the skin cooling circuit 142. The first and second supply circuits 122, 124 can supply cooling air as needed which can be the same or different types of cooling air. The wall cooling circuit 140 and the skin cooling circuit 142 can alternately be supplied from the same supply circuit (e.g. 124) wherein the one supply circuit 124 is fluidly coupled to both a channel 150 and a wall cooling passage 144.

Figure 6:
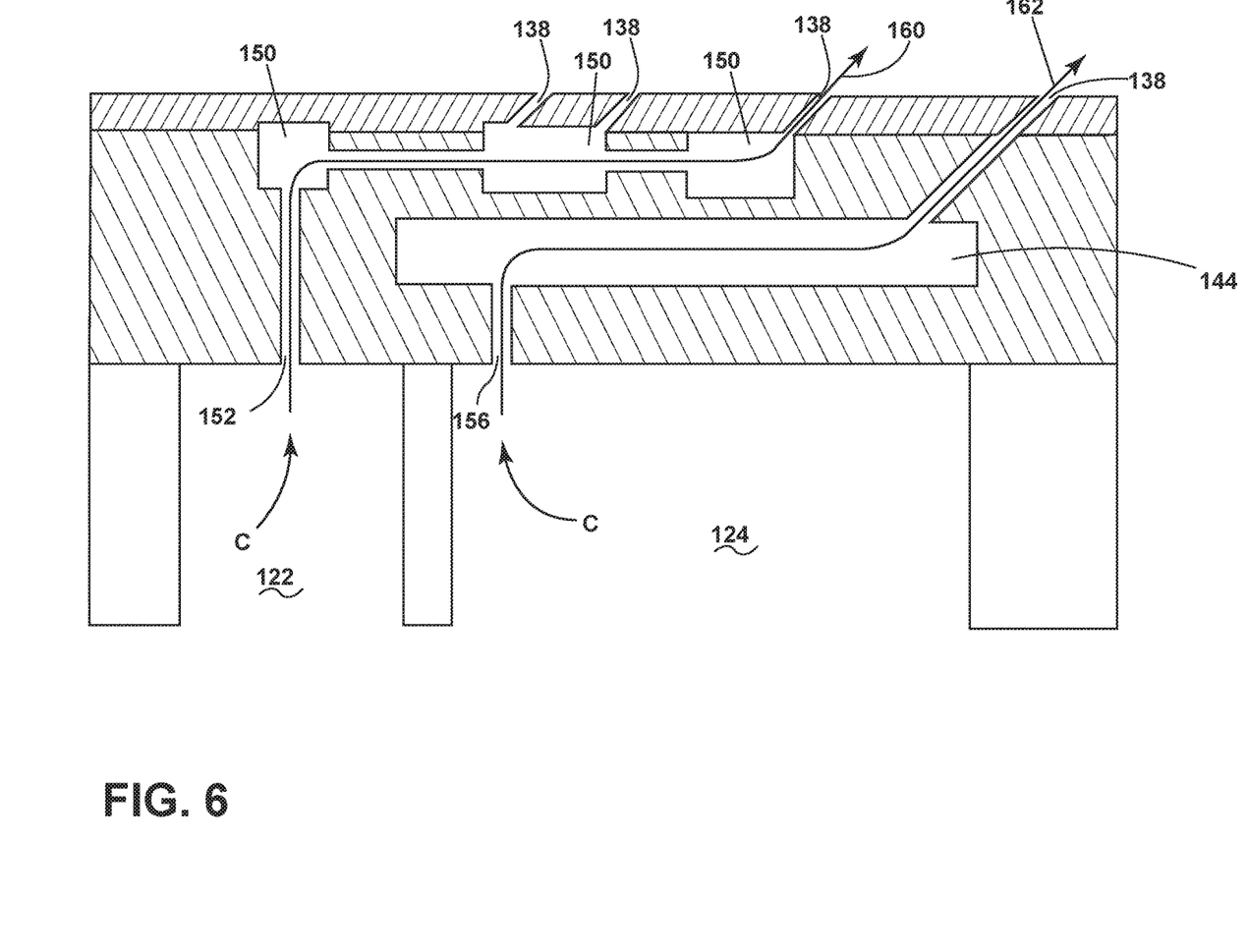
FIG. 6 is an enlarged view of a portion of the airfoil from FIG. 5 illustrating flow air supply paths.

Turning now to FIG. 6, a conditioned air is supplied to both the first and second supply circuits 122, 124 via, for example, one of the first, second, or third inlet passages 88, 90, 92. The conditioned air can be the same or differently conditioned for each of one of the supply circuits 122, 124. At least one of the conditioned air is cooling air wherein a cooling fluid flow C is provided to the first and second supply circuits 122, 124. By conditioned, it is meant that the air supplies can have different characteristics, like pressure and temperature, for example.

The skin cooling circuit 142 defines a path for conditioned air to flow as a first air supply 160 from the first supply circuit 122, through the channels 150, and exit via the film holes 138. The wall cooling circuit 140 defines a path for conditioned air to flow as a second air supply 162 from the second supply circuit 124, through the wall passages 144, and exit via the film holes 138. The first and second air supplies 160, 162 flow parallel to each other during operation.

Figure 7A:
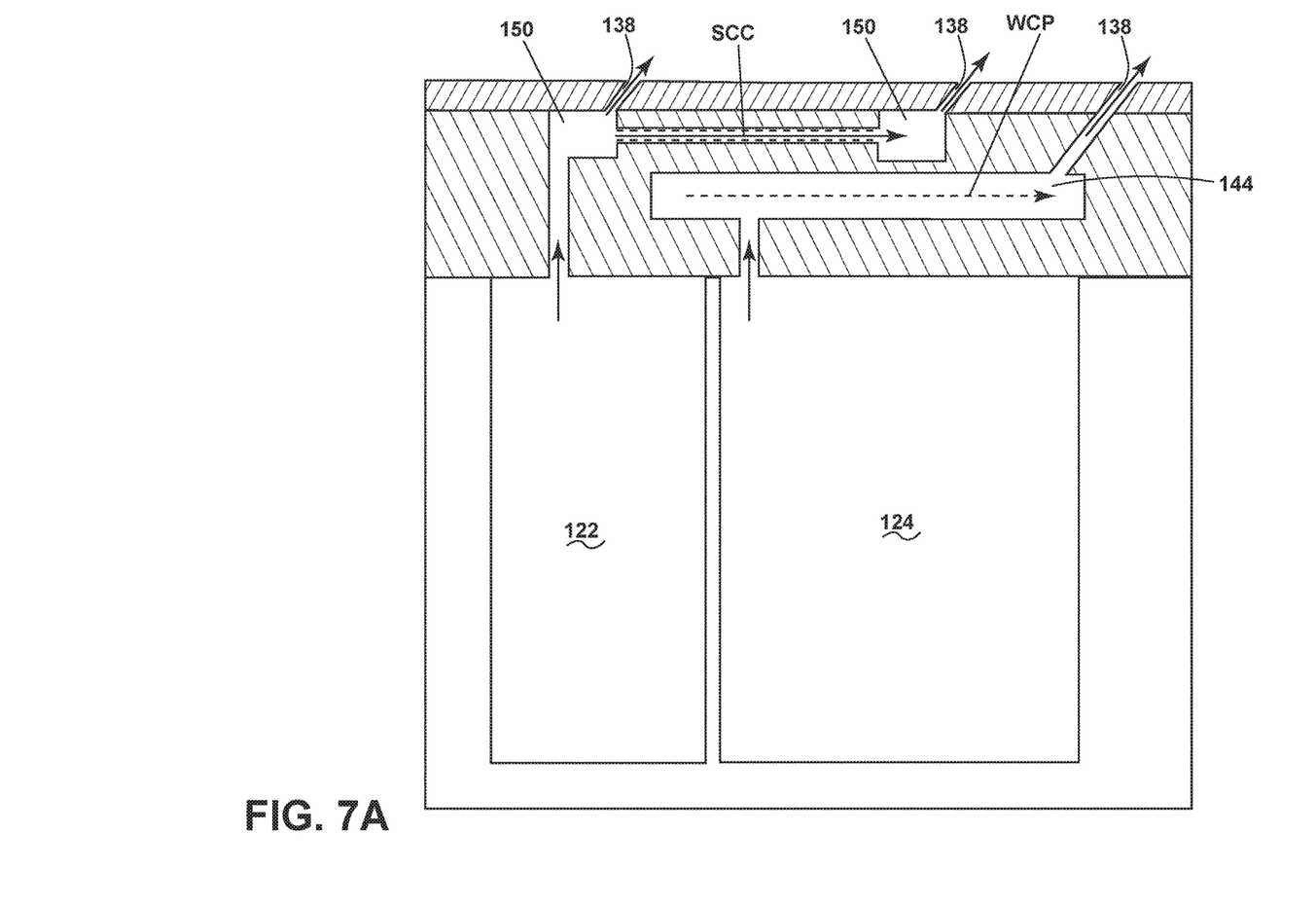
FIGS. 7A and 7B are enlarged view of a portion of the airfoil from FIG. 5 illustrating flow directions.
Figure 7B:
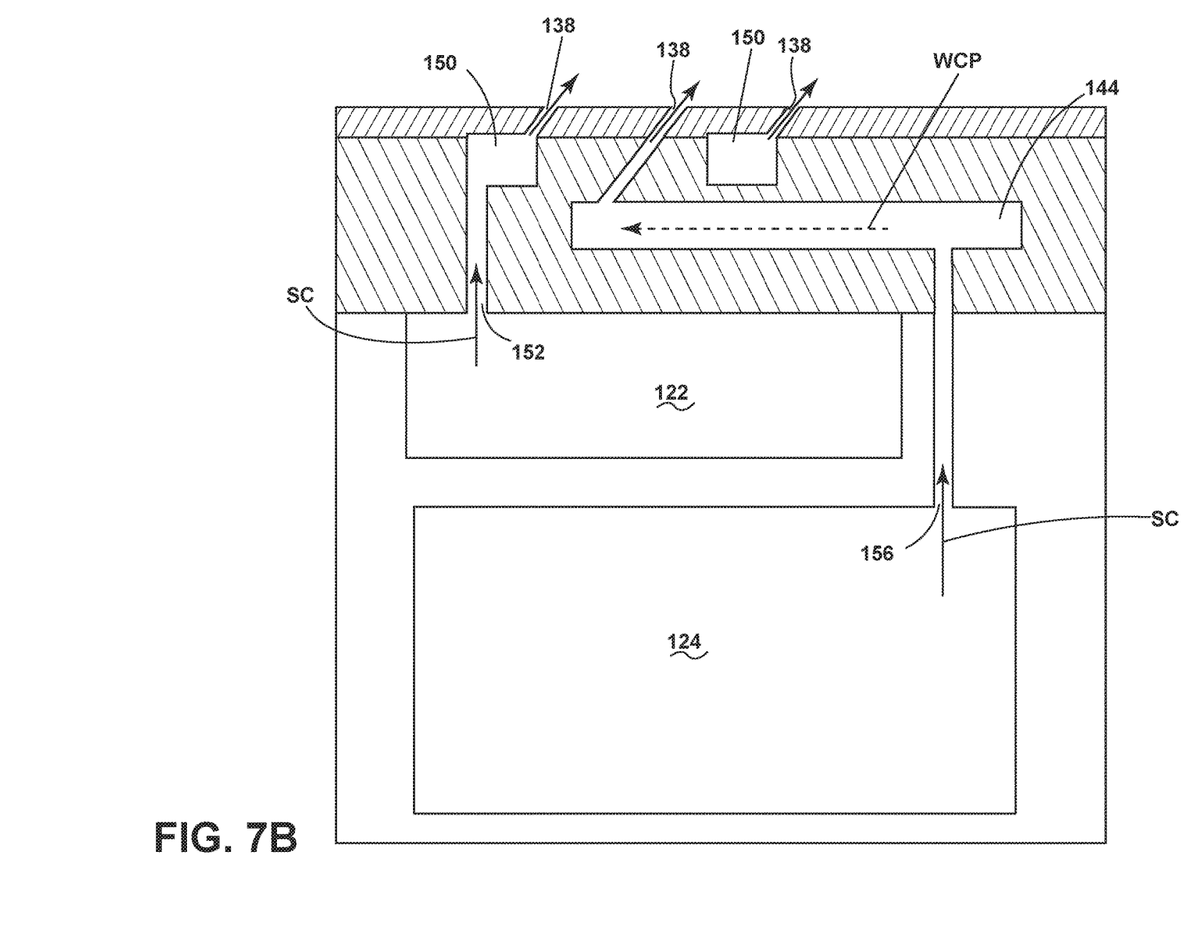

While numerous flow paths are possible with the geometry of the configuration described herein, two possible flow paths are illustrated in FIGS. 7A and 7B. These flow paths are for illustrative purposes only and are not meant to be limiting.

Turning to FIG. 7A, when conditioned air is supplied to the supply circuits 122, 124, pressure differences between the supply circuits 122, 124 and adjacent channels 150 and wall passages 140 cause the cooling air to move from the supply circuits 122, 124 in a first flow direction SC defined by the supply circuits 122, 124 where the cooling fluid flow C passes through the internal holes 152, 156.

A second flow direction SCC is dependent on the pressure differentiations between one of the multiple channels 150 and the first supply circuit 122 along with placement of the film holes 138 and the internal hole 152. A third flow direction WCP can flow in the same direction as the second flow direction SCC along the wall passages 140 creating a co-flow in which cooling air runs parallel with and in the same direction as corresponding cooling air in adjacent circuits. This direction is also dependent on pressure differentiations, in this case between the wall cooling passages 140 and the second supply circuit 124, and placement of the film holes 138 and the internal hole 156.

Turning to FIG. 7B, the placement of film holes and the internal holes 152 and 156 in addition to the pressure differentiations present between adjacent cooling circuits can also cause the second flow direction SCC and the third flow direction WCP to be opposite of each other creating a counter-flow in which cooling air runs parallel with and in the opposite direction as corresponding cooling air in adjacent circuits.

Figure 8A:
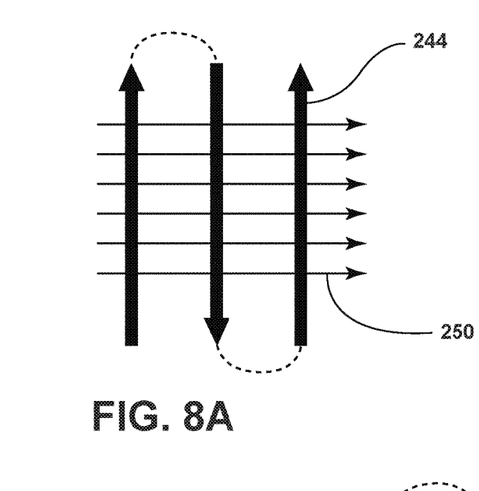
FIGS. 8A, 8B, and 8C are additional enlarged views of a portion of the airfoil from FIG. 5 illustrating different paths of the flow directions from FIG. 6.
Figure 8B:
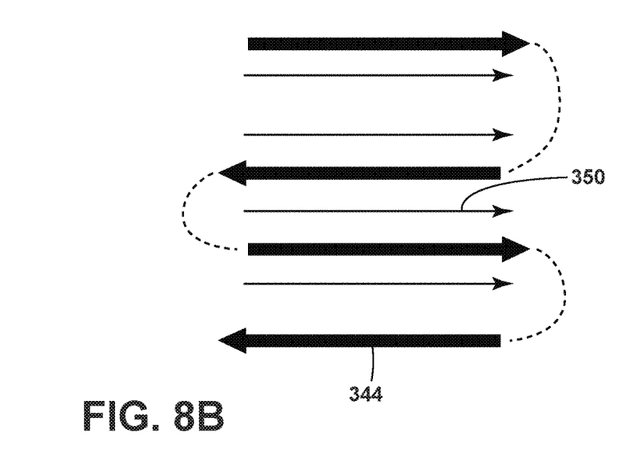
Figure 8C:
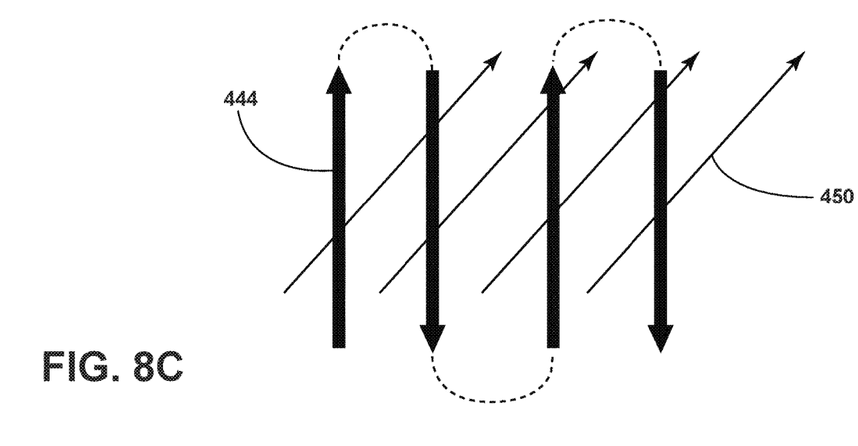

It can be seen that a plurality of orientations can be contemplated regarding the geometry of the skin cooling circuit 142 relative to the wall cooling passages 144. Some of the orientations are shown in FIGS. 8A, 8B, and 8C. While three different possible orientations are contemplated, it should be understood that they are for illustrative purposes only and are not meant to be limiting. FIG. 8A depicts a relative geometry wherein channels 250 run perpendicular to wall passages 244. FIG. 8B illustrates a relative geometry wherein channels 350 and wall passages 344 run parallel to each other. Furthermore, FIG. 8C shows a relative orientation wherein channels 450 and wall passages 444 run at an angled orientation between the geometries depicted in FIGS. 8A and 6B.

Wall cooling circuits 140 and skin cooling circuits 142 can co-flow, counter-flow, or flow at any straight or arcuate intermediate angles with respect to each other, as long as each layer of cooling is retained within its corresponding circuit.

A method of cooling the airfoil 79 comprises first passing a cooling airflow C from a source, for example the supply circuit 124, in parallel to the wall cooling passage 144 in the interior 134 of the outer wall 95 of an airfoil 79 to form a wall cooling circuit 140 while simultaneously passing a cooling airflow from a separate source in parallel to the channel 150 in the outer surface 130 of the outer wall 95, and then to a film hole 38 in a coating overlying the outer surface 130 to form a skin cooling circuit 142.

The passing of the cooling airflow through the skin cooling circuit can be a first direction SCC and the passing of the cooling airflow through the wall cooling circuit can be a second direction WCP wherein the first direction and second directions are the same, different, or opposite as described herein.

It can be contemplated that an entire engine component with multiple wall passages and skin cooling circuits can be cast as a single piece after which molding and reforming portions of the engine component can be implemented and then a coating applied. Additive manufacturing where a main component such as the supply circuit is cast and the additional components including the wall passages, fluidly connecting holes, and skin cooling circuits are added can also be contemplated.

The disclosure herein consists of cooled components that utilize both wall cooling circuits and skin cooling circuits flowing in parallel and separate sub-circuits, in which the wall cooling circuits are fed from a different source than the skin cooling circuits. Skin cooling circuits alone can allow up to 30% cooling flow reduction.

Benefits to utilizing wall cooling circuits in parallel with skin cooling circuits include increasing thermal uniformity of the substrate structure. In the event that the more at risk skin cooling circuit fails, the parallel wall cooling circuit can still provide thermal and structural integrity to the engine component.

In newer generation turbine cooling 30 to 50% less flow is utilized as compared to prior turbine cooling. Combining the wall cooling circuit with skin cooling circuits enables 30% cooling flow reduction, decreases cost, and decreases specific fuel consumption.

This written description uses examples to disclose the invention, including the best mode, and to enable any person skilled in the art to practice the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An airfoil for a turbine engine, the airfoil comprising:
an outer wall having an outer surface facing an exterior and an inner surface bounding an interior space, the outer wall defining a pressure side and a suction side extending axially between a leading edge and a trailing edge and extending radially between a root and a tip;
at least one coating applied to the outer surface;
at least one channel formed in the outer surface and at least one film hole passing through the at least one coating to the at least one channel to fluidly connect the exterior and the at least one channel;
at least one wall cooling passage provided within at least a portion of an interior of the outer wall and another at least one film hole passing through the at least one coating and the portion of the interior of the outer wall to the at least one wall cooling passage to fluidly connect the exterior and the at least one wall cooling passage; and
first and second supply circuits located within the interior of the outer wall, with the first supply circuit fluidly coupling a first air supply to the at least one channel to define at least one skin cooling circuit and the second supply circuit fluidly coupling a second air supply to the at least one wall cooling passage to define at least one wall cooling circuit;

wherein the at least one wall cooling passage is located internally of the at least one channel between the second supply circuit and the at least one channel and the at least one skin cooling circuit and the at least one wall cooling circuit retain fluidly separate layers of cooling extending from the supply circuits to the exterior.

2. The airfoil of claim 1 wherein the first and second air supplies supply a same conditioned air.

3. The airfoil of claim 2 wherein the same conditioned air is cooling air.

4. The airfoil of claim 3 wherein the first and second supply circuits are the same supply circuit.

5. The airfoil of claim 1 wherein the first and second air supplies supply differently conditioned air.

6. The airfoil of claim 5 wherein the differently conditioned air comprises at least one cooling air supply.

7. The airfoil of claim 1 wherein the at least one skin cooling circuit and the at least one wall cooling circuit are operated in parallel.

8. The airfoil of claim 1 wherein the at least one skin cooling circuit is multiple skin cooling circuits.

9. The airfoil of claim 1 wherein the at least one wall cooling circuit is multiple wall cooling circuits.

10. The airfoil of claim 9 wherein the at least one skin cooling circuit is multiple skin cooling circuits.

11. The airfoil of claim 1 wherein the at least one channel comprises multiple channels.

12. The airfoil of claim 11 wherein the at least one film hole is multiple film holes for each of the multiple channels.

13. The airfoil of claim 1 wherein the supply circuits define a first flow direction, the at least one channel defines a second flow direction, and the at least one wall cooling passage defines a third flow direction.

14. The airfoil of claim 13 wherein at least two of the first, second and third flow directions are the same direction.

15. The airfoil of claim 14 wherein the second and third flow directions are the same direction.

16. The airfoil of claim 13 wherein at least two of the first, second and third flow directions are opposite.

17. The airfoil of claim 16 wherein the second and third flow directions are opposite.

18. The airfoil of claim 1 wherein the at least one coating comprises multiple coatings.

19. An engine component for a turbine engine, which generates a hot air flow, and provides a cooling fluid flow, the component comprising:
a wall separating the hot air flow from the cooling fluid flow and having a first surface along with the hot air flow in a hot flow path and a second surface facing the cooling fluid flow;
at least one coating applied to the first surface;
at least one channel formed in the first surface and at least one hole passing through the at least one coating to the at least one channel;
at least one wall cooling passage provided within at least a portion of an interior of the wall; and
first and second supply circuits, with the first supply circuit fluidly coupling the cooling fluid flow to the at least one channel to define at least one skin cooling circuit and the second supply circuit fluidly coupling the cooling fluid flow to the at least one wall cooling passage to define at least one wall cooling circuit;
wherein the at least one wall cooling passage is located internally of the at least one channel between the second supply circuit and the at least one channel and the at least one skin cooling circuit and the at least one wall cooling passage retain fluidly separate layers of cooling extending between the hot air flow and the cooling fluid flow.

20. The engine component of claim 19 wherein the at least one skin cooling circuit and wall cooling circuit are operated in parallel.

21. The engine component of claim 19 wherein the at least one skin cooling circuit is multiple skin cooling circuits.

22. The engine component of claim 19 wherein the at least one wall cooling circuit is multiple wall cooling circuits.

23. The engine component of claim 22 wherein the at least one skin cooling circuit is multiple skin cooling circuits.

24. The engine component of claim 19 wherein the at least one channel further comprising multiple channels.

25. The engine component of claim 24 wherein the at least one hole is multiple holes for each of the multiple channels.

26. The engine component of claim 19 wherein the first and second supply circuits define a first flow direction, the at least one channel defines a second flow direction, and the at least one wall cooling passage defines a third flow direction.

27. The engine component of claim 26 wherein at least two of the first, second and third flow directions are the same direction.

28. The engine component of claim 27 wherein the second and third flow directions are the same direction.

29. The engine component of claim 26 wherein at least two of the first, second and third flow directions are opposite.

30. The engine component of claim 29 wherein the second and third flow directions are opposite.

31. The engine component of claim 19 wherein the at least one coating comprises multiple coatings.

* * * * *